United States Patent [19]

Magerstedt et al.

[11] Patent Number: 5,717,018
[45] Date of Patent: Feb. 10, 1998

[54] LASER-INSCRIBABLE POLYMER MOULDING COMPOSITIONS

[75] Inventors: Herbert Magerstedt, Moers; Aziz El-Sayed, Leverkusen; Frank Gerling, Düsseldorf, all of Germany

[73] Assignee: Bayer AG, Leverkusen, Germany

[21] Appl. No.: 713,242

[22] Filed: Sep. 12, 1996

[30] Foreign Application Priority Data

Sep. 21, 1995 [DE] Germany ............... 195 35 055.3
Oct. 13, 1995 [DE] Germany ............... 195 38 247.1

[51] Int. Cl.$^6$ ................ C08K 5/03; C08K 3/32
[52] U.S. Cl. ................ 524/413; 524/417; 524/412
[58] Field of Search ................ 524/413, 417, 524/414, 418, 406, 606, 412; 523/136, 135, 137, 138

[56] References Cited

U.S. PATENT DOCUMENTS

| | | | |
|---|---|---|---|
| 2,887,462 | 5/1959 | Van Oot | 524/413 |
| 2,984,647 | 5/1961 | White | 524/413 |
| 2,985,621 | 5/1961 | Brandes et al. | 524/413 |
| 3,201,369 | 8/1965 | Dell et al. | 524/413 |
| 3,352,821 | 11/1967 | Costain et al. | 524/417 |
| 3,425,986 | 2/1969 | Market | 524/406 |
| 3,479,319 | 11/1969 | Hergenrother | 524/417 |
| 3,634,319 | 1/1972 | Harrison et al. | 524/417 |
| 4,032,509 | 6/1977 | Lee | 524/406 |
| 4,208,489 | 6/1980 | Schmidt et al. | 524/413 |
| 4,390,654 | 6/1983 | Schuler et al. | 524/413 |
| 5,063,137 | 11/1991 | Kiyonari et al. | 524/417 |
| 5,157,064 | 10/1992 | Gijsman | 524/606 |
| 5,441,997 | 8/1995 | Walsh et al. | 524/414 |

FOREIGN PATENT DOCUMENTS

| | | |
|---|---|---|
| 0 063 768 | 11/1982 | European Pat. Off. |
| 0 190 997 | 8/1986 | European Pat. Off. |
| 0 400 305 | 12/1990 | European Pat. Off. |
| 0 542 115 | 5/1993 | European Pat. Off. |

OTHER PUBLICATIONS

Orbit Abstract of EP 0 400 305 (Dec. 5, 1990).
Orbit Abstract of EP 0 190 997 (Aug. 13, 1986).
Orbit Abstract of EP 0 063 768 (Nov. 3, 1982).
Orbit Abstract of EP 0 542 115 (May 19, 1993).
Database WPI, Section Ch, Week 8315, Abstract of JP-A-58 037 040 (Ishikawajima-Harima Juko), Mar. 4, 1983.
Database WPI, Section Ch, Week 8505, Abstract of SU-A-1 100 104 (Leningrad Lensovet Tech), Jun. 30, 1984.

*Primary Examiner*—Veronica P. Hoke
*Attorney, Agent, or Firm*—Connolly & Hutz

[57] ABSTRACT

A thermoplastic molding composition, containing
A) 99.95 to 30 parts by weight of thermoplastic polymer,
B) 0 to 3 parts by weight of copper pyrophosphate hydrate,
C) 0 to 3 parts by weight of copper(II) hydroxide phosphate,
D) 0 to 3 parts by weight of manganese sulphate hydrate,
E) 0 to 50 parts by weight of fillers and reinforcing materials,
F) 0 to 60 parts by weight of flame retardant additives,
G) 0 to 30 parts by weight of elastomeric modifiers,
H) 0 to 8 parts by weight of antimony trioxide, wherein at least one of the components B) or D) is contained in the mixture.

14 Claims, No Drawings

LASER-INSCRIBABLE POLYMER MOULDING COMPOSITIONS

This invention relates to thermoplastic polymer molding compositions with a defined system of additives, and to molding for laser inscription produced from these thermoplastic molding compositions.

The application of patterns, letters, numbers and/or images by means of laser beam writers for the marking and decoration of molded parts made of plastics is becoming increasingly important. In addition to its economy compared with conventional inscription methods, laser inscription offers a high degree of flexibility as regards the type of characters, size of characters and design of characters, irrespective of the lot size. The marking of electrical/ electronic components, key covers, housings and identity cards are classic applications of laser inscription.

The following possibilities are known for the marking of plastics by means of laser inscription:

1. Dark Characters on a Light Background a polymer matrix is colored with light coloring agents—pigments or colorants. During the laser inscription the polymer matrix/the coloring agent is partially carbonised by the absorption of laser energy. This produces a dark coloration of the light polymer matrix. This behavior is restricted to polymers which tend to carbonise.

The contrast ratios obtained by this means are insufficient for many areas of use.

The addition of coloring agents which change their color due to the absorption of laser energy is described in EP-A 0 190 997. Thus polybutylene terephthaiate is colored red with iron oxide. Laser inscription produces dark characters on a red background. The contrast ratio has proved to be insufficient.

2. Light Characters on a Dark Background

Polymers, coloring agents or additives which tend to foam due to the absorption of laser energy have been proven in practice for this type of inscription. Foaming produces light characters on a dark background. The contrast ratios which can be achieved are insufficient for many areas of use.

Laser-inscribable molding compositions which contain copper(II) hydroxide-phosphate or molybdenum(VI) oxide as additives are known from EP-A 400 305.

The present invention relates to polymer molding compositions which produce dark characters on a light background with a very high contrast ratio on the absorption of laser energy.

It has been found that polymer molding compositions which contain copper pyrophosphate hydrate, on its own or in combination with copper(II) phosphate, produce molding compositions with which dark characters on a light background can be obtained in the polymer matrix by absorption of laser energy. Various degrees of grey can be obtained by varying the laser energy.

The present invention therefore relates to thermoplastic molding compositions, containing A) 99.95 to 30, preferably 99,9 to 35, particularly 99.9 to 40 parts by weight of thermoplastic polymer
B) 0 to 3 parts by weight of copper pyrophosphate hydrate,
C) 0 to 3 parts by weight of copper (II) hydroxide phosphate,
D) 0 to 3 parts by weight of manganese sulphate hydrate,
E) 0 to 50 parts by weight of fillers and reinforcing materials,
F) 0 to 60 parts by weight of flame retardant additives,
G) 0 to 30 parts by weight of elastomeric modifiers,
H) 0 to 8 parts by weight of antimony trioxide, wherein at least one of the components B) or D) is contained in the mixture.

The present invention also relates to the use of the aforementioned thermoplastic molding compositions for the production of moldings or molded parts which can be inscribed by means of laser energy, and to the moldings produced therefrom.

The present invention further relates to a method of inscribing moldings by means of laser energy.

Commercially available laser systems, preferably Nd-YAG solid lasers, may be used as the energy sources. The wavelength may be between 193 and 10,600 nm, preferably between 532 and 1064 nm.

The molding compositions according to the invention may be used for the application of optical information in the form of patterns, graphics, numbers, letters, graphic characters, images (e.g. passport photographs, portraits, photographs) etc., by means of laser energy, e.g. by laser beam writers.

Photographic images may thus be transferred to the molding compositions which are used according to the invention, for example.

Component A)

Examples of polymers or copolymers which are suitable as the polymer matrix include those based on polyalkylene terephthalates, aromatic polyesters, polyamide, polycarbonate, polyacrylate, polymethacrylate, ABS graft polymers, polyolefines such as polyethylene or polypropylene, polystyrene, polyvinyl chloride, polyoxymethylene, polyimide, polyethers and polyether ketones, which may be used individually or as a blend of different polymers.

Polyalkylene terephthalates in the sense of the invention are the reaction products of aromatic dicarboxylic acids or reactive derivatives thereof (e.g. dimethyl esters or anhydrides) and aliphatic, cycloaliphatic or araliphatic diols, and mixtures of these reaction products.

Preferred polyalkylene terephthalates can be prepared by known methods from terephthalic acid (or reactive derivatives thereof) and aliphatic or cycloaliphatic diols containing 2 to 10 C atoms (Kunststoff-Handbuch [*Plastics Handbook*], Volume VIII, page 695 et seq., Karl-Hanser-Verlag, Munich 1973).

Preferred polyalkylene terephthalates contain at least 80, preferably 90 mole %, with respect to the dicarboxylic acid, of terephthalic acid radicals, and at least 80, preferably at least 90 mole %, with respect to the diol component, of ethylene glycol radicals and/or 1,4-butanediol radicals.

In addition to terephthalic acid radicals, the preferred polyalkylene terephthalates may contain up to 20 mole % of radicals of other aromatic dicarboxylic acids containing 8 to 14 C atoms or of aliphatic dicarboxylic acids containing 4 to 12 C atoms, such as radicals of phthalic acid, isophthalic acid, naphthalene-2,6-dicarboxylic acid, 4,4'-diphenyldicarboxylic acid, succinic, adipic or sebacic acid, azelaic acid or cyclohexane diacetic acid.

In addition to ethylene or 1,4-butanediol-glycol radicals, the preferred polyalkylene terephthalates may contain up to 20 mole % of other aliphatic diols containing 3 to 12 C atoms or of cycloaliphatic diols containing 6 to 21 C atoms, e.g. radicals of 1,3-propanediol, 2-ethylpropanediol-1,3, neopentyl glycol, 1,5-pentanediol, 1,6-hexanediol, cyclohexane-dimethanol-1,4, 3-methylpentanediol-2,4, 2-methylpenta-nediol-2,4, 2,2,4-trimethylpentanediol-1,3 and -1,6,2-ethylhexanediol-1,3, 2,2-diethylpropanediol-1,3, 2,5-hexanediol, 1,4-di-(β-hydroxyethoxy)-benzene, 2,2-bis-(4-hydroxycyclohexyl)-propane, 2,4-dihydroxy-1,1,3,3- tetramethyl-cyclobutane, 2,2-bis-(3-β-hydroxyethoxyphenyl)-propane and 2,2-bis-(4-hydroxypropoxyphenyl)-propane (DE-OS 2 407 674, 2 407 776, 2 715 932).

The polyalkylene terephthalates may be branched by the incorporation of relatively small amounts of trihydric or tetrahydric alcohols or of tribasic or tetrabasic carboxylic acids, such as those which are described in DE-OS 1 900 270 and U.S. Pat. No. 3,692,744, for example. Examples of preferred branching agents include trimesic acid, trimellitic acid, trimethylolethane and -propane and pentaerythritol.

It is advisable to use not more than 1 mole % of the branching agent with respect to the acid component.

Polyalkylene terephthalates which are particularly preferred are those which have been prepared solely from terephthalic acid and reactive derivatives thereof (e.g. dialkyl esters thereof) and ethylene glycol and/or 1,4-butanediol (polyethylene and polybutylene terephthalates), and mixtures of these polyalkylene terephthalates.

Preferred polyalkylene terephthalates also include copolyesters which are prepared from at least two of the aforementioned acid components and/or from at least two of the aforementioned alcohol components; poly-(ethylene glycol/1,4-butanediol)-terephthalates are copolyesters which are particularly preferred.

The polyalkylene terephthalates which are preferably used as component A generally have an intrinsic viscosity of about 0.4 to 1.5 dl/g, preferably 0.5 to 1.3 dl/g, measured in phenol/o-dichlorobenzene (1:1 in parts by weight) at 25° C.

Aromatic polycarbonates in the sense of this invention are understood to mean homopolycarbonates and mixtures of these polycarbonates, which are based on at least one of the following diphenols for example:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
α,α'-bis-(hydroxyphenyl)-diisopropylbenzenes,
and derivatives thereof containing alkylated and halogenated nuclei.

These and other suitable diphenols are described, for example, in U.S. Pat. Nos. 3,028,365, 2,999,835, 3,148,172, 2,275,601, 2,99 283, 3,271,367, 3,062,781, 2,970,131 and 2,999,846, in German Offenlegungsschriften [patents laid open to public inspection] 1 570 703, 2 063 050, 2 063 052, 2 211 956 and 2 211 957, in French Patent 1 561 518 and in the monograph by H. Schnell, "Chemistry and Physics of Polycarbonates", Interscience Publishers, N.Y. 1964.

Examples of preferred diphenols include:
2,2-bis-(4-hydroxyphenyl)-propane,
1,1-bis-(4-hydroxyphenyl)-cyclohexane,
2,2-bis-(3,5-dichloro-4-hydroxyphenyl)-propane,
2,2-bis-(3,5-dibromo-4-hydroxyphenyl)-propane,
2,2-bis-(3,5-dimethyl-4-hydroxyphenyl)-propane,
bis-(3,5-dimethyl-4-hydroxyphenyl)-methane,
bis-(4-hydroxyphenyl)-sulphide,
1,1-bis-(4-hydroxyphenyl)-3,3,5-trimethylcyclohexane.

The diphenols may be used either individually or in admixture. Aromatic polycarbonates which are particularly preferred are those polycarbonates based on 2,2-bis-(4-hydroxyphenyl)-propane or on one of the other diphenols cited as being preferred. Those which are most particularly preferred are based on 2,2-bis-(4-hydroxyphenyl)-propane, 2,2-bis-(3,5-dimethyl-4-hydroxyphenyl)-propane or 1,1-bis-(4-hydroxyphenyl)-3,3,5-trimethylcyclohexane or mixtures of 2,2-bis-(4-hydroxyphenyl)-propane and 1,1-bis-(4-hydroxyphenyl)-3,3,5-trimethylcyclohexane.

The aromatic polycarbonates may be prepared by known methods, e.g. by the transesterification, in the melt, of a corresponding bisphenol with diphenyl carbonate, and from bisphenols and phosgene in solution. The solution may be homogeneous (pyridine process) or heterogeneous (two-phase boundary process) (see H. Schnell, "Chemistry and Physics of Polycarbonates", Polymer Reviews, Vol. IX, page 33 et seq., Interscience Publ. 1964).

As a role, the aromatic polycarbonates have average molecular weights $M_w$ of about 10,000 to 200,000, preferably 20,000 to 80,000 (determined by gel chromatography after prior calibration).

In particular, copolycarbonates in the sense of the invention are polydiorganosiloxanepolycarbonate block copolymers with an average molecular weight $M_w$ of about 10,000 to 200,000, preferably 20,000 to 80,000 (determined by gel chromatography after prior calibration), and with a content of aromatic carbonate structural units of about 75 to 97.5% by weight, preferably 85 to 97% by weight, and a content of polydiorganosiloxane structural units of about 25 to 2.5% by weight, preferably 15 to 3% by weight, the block copolymers being produced from polydiorganosiloxanes containing α,ω-bishydroxyaryloxy terminal groups and with a degree of polymerisation $P_n$ of 5 to 100, preferably 20 to 80.

The polydiorganosiloxane-polycarbonate block copolymers may also be a mixture of polydiorganosiloxane-polycarbonate block copolymers with customary, polysiloxane-free, thermoplastic polycarbonates, where the total content of polydiorganosiloxane structural units in this mixture is about 2.5 to 25% by weight.

Polydiorganosiloxane-polycarbonate block copolymers such as these are characterised in that they firstly contain aromatic carbonate structural units (1) and secondly contain polydiorganosiloxanes (2) containing aryloxy terminal groups in their polymer chain:

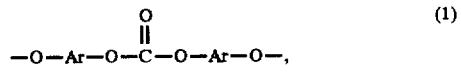
(1)

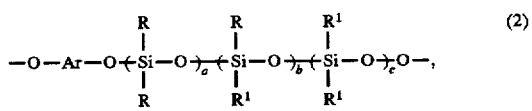
(2)

where
Ar represent the same or different aryl radicals from diphenols, and
R and $R^1$ are the same or different and represent a linear alkyl, a branched alkyl, an alkenyl, a halogenated linear alkyl, a halogenated branched alkyl, an aryl or a halogenated aryl, but preferably represent methyl,
and
the number of diorganosiloxy units n=a+b +c =5 to 100, preferably 20 to 80.

The alkyl in the above formula (2) is a $C_1$–$C_{20}$ alkyl, for example; the alkenyl in the above formula (2) is a $C_2$–$C_6$ alkenyl, for example; the aryl in the above formula (2) is a $C_6$–$C_{14}$ aryl. In the above formula, halogenated means partially or completely chlorinated, brominated or fluorinated.

Examples of alkyls, alkenyls, aryls, halogenated alkyls and halogenated aryls include methyl, ethyl, propyl, n-butyl, tert.-butyl, vinyl, phenyl, naphthyl, chloromethyl, perfluorobutyl, perfluorooctyl and chlorophenyl.

Polydiorganosiloxane-polycarbonate block copolymers of this type are known from U.S. Pat. Nos. 3,189,662, 3,821,325 and 3,832,419, for example.

Preferred polydiorganosiloxane-polycarbonate block copolymers are produced by reacting polydiorganosiloxanes containing α,ω-bishydroxyaryloxy terminal groups with other diphenols, optionally with the use in conjunction of branching agents in the usual amounts, e.g. by the two-phase boundary process (in this connection, see H. Schnell, Chemistry and Physics of Polycarbonates Polymer Rev. Vol. IX, page 27 et seq., Interscience Publishers N.Y. 1964), the ratio of bifunctional phenolic reactants being selected in each case so that it results in the content according to the invention of aromatic carbonate structural units and diorganosiloxy units.

Polydiorganosiloxanes of this type, which contain α,ω-bishydroxyaryloxy terminal groups, are known from U.S. Pat. No. 3,419,634, for example.

ABS graft polymers in the sense of the invention are graft polymers of

A.1) 5 to 95, preferably 30 to 80 parts by weight, of a mixture of

A.1.1) 50 to 95 parts by weight of styrene, α-methylstyrene, a styrene with a nucleus substituted by halogen or methyl, a $C_1$–$C_8$ alkyl methacrylate, particularly methyl methacrylate, a $C_1$–$C_8$ alkyl acrylate, particularly methyl acrylate, or mixtures of these compounds, and A1.2) 5 to 50 parts by weight of acrylonitrile, methylacrylonitrile, $C_1$–$C_8$ alkyl methacrylates, particularly methyl methacrylate, a $C_1$–$C_8$ alkyl acrylate, particularly methyl acrylate, maleic anhydride, $C_1$–$C_4$ alkyl- or phenyl-N-substituted maleic imides or mixtures of these compounds, on A.2) 5 to 95, preferably 20 to 70 parts by weight of butadiene, polybutadiene or a butadiene/styrene copolymer with a glass transition temperature below −10° C.

Graft polymers such as these are described in DE-OS 2 035 390 (=U.S. Pat. No. 3,644,574) or in DE-OS 2 248 242 (=GB-PS 1 409 275), for example.

Since, as is known, the graft monomers are not necessarily completely grafted on to the graft base during the graft reaction, copolymers are formed from the graft monomers. The term "ABS graft polymers" is also to be understood to mean those products which contain just these copolymers, due to polymerisation.

The average particle diameter $d_{50}$ of the ABS graft polymer is generally 0.5 to 5 nm, preferably 0.1 to 2 nm. The average particle diameter $d_{50}$ is the diameter above and below which 50% by weight of the particles occur in each case. It can be determined by means of ultracentrifuge measurements (W. Scholtan, H. Lange, Kolloid, Z. Polymere 250 (1972), 782–796).

Polyolefines are polyethylene, polypropylene, poly-1-butene and polymethylpentene, which still contain small amounts of unconjugated dienes which are incorporated by polymerisation. These polymers are known and are described in Roempp's Chemielexikon [Roempp's Encyclopedia of Chemistry], Eighth Edition 1987, Volume 5, page 3307, and in the literature references cited there. Polypropylene is preferred.

Aliphatic polyamides or polyamides with a predominantly aliphatic content are generally used in the thermoplastic polyamide molding compositions. Preferred examples include polyamide 6 or polyamide 6,6 or copolyamides of polyamide 6 with diamines (preferably $C_4$–$C_{16}$–, particularly $C_4$–$C_8$ alkylene diamines) and dicarboxylic acids (preferably $C_4$–$C_{12}$–, particularly $C_4$–$C_8$ alkylene dicarboxylic acids) or polyamides 6,6 with a comonomer content of 20% by weight at most.

Component B

Copper pyrophosphate hydrate [$Cu_2P_2O_7H_2O$] is commercially available, e.g. from Riedel de Haen.

Component C

Copper(II) hydroxide-phosphate [$Cu_2(OH)PO_4$] is also commercially available, e.g. from Riedel de Haen.

Components B and C may be present either in pure form, or in concentrated form (generally as granular materials or powders), or as a batch, i.e. incorporated in a polymer.

Component D

Manganese sulphate hydrate [$MnSO_4H_2O$] is also commercially available.

Components B), C) and/or D) are preferably added in an amount of 0.05 to 2.5, particularly 0.5 to 2.5, parts by weight.

Component E

Glass fibres, glass spheres, mica, silicates, quartz, french chalk, titanium dioxide, wollastonite, etc. may be used as fillers and reinforcing materials, and may also be surface-treated. The preferred reinforcing materials are commercially available glass fibres. Glass fibres, which generally have a fibre diameter between 8 and 14 μm, may be used as continuous glass fibres or as cut or milled glass fibres, wherein the fibres may be provided with a suitable size system and with a silane-based bonding agent or bonding agent system. 8 to 45 parts by weight, particularly 10 to 40 parts by weight, of fillers and reinforcing materials are preferably added to the mixture.

Component F

Commercially available organic compounds, or halogen compounds with synergistic or commercially available organic nitrogen compounds, or organic/inorganic phosphorus compounds, are suitable as flame retardant additives. Mineral flame retardant additives such as Mg hydroxide or Ca-Mg carbonate hydrate may also be used.

The molding compositions according to the invention may contain up to 20, preferably 3 to 18, particularly 6 to 15 parts by weight of halogenated compounds and up to 8, preferably 2 to 6 parts by weight of antimony compounds, particularly antimony trioxide or antimony pentoxide.

The following should be cited as examples of halogenated, particularly brominated and chlorinated, organic compounds:
ethylene- 1,2-bistetrabromophthalimide,
epoxidised tetrabromobisphenol A resin,
tetrabromobisphenol A oligocarbonate,
tetrachlorobisphenol A oligocarbonate,
pentabromopolyacrylate,
brominated polystyrene.

Pentabromopolyacrylate generally has an average molecular weight $M_w$ (weight average) of 10,000 to 200,000; brominated polystyrene generally has an average molecular weight of 10,000 to 500,000.

Epoxidised tetrabromobisphenol A and tetrabromobisphenol A oligocarbonate are preferably used.

Epoxidised tetrabromobisphenol A is a known diepoxy resin with a molecular weight of about 350 to about 2100, preferably 360 to 1000, most preferably 370 to 400, and essentially consists of at least one condensation product of bisphenol A and an epihalohydrin, and is represented by formula (I)

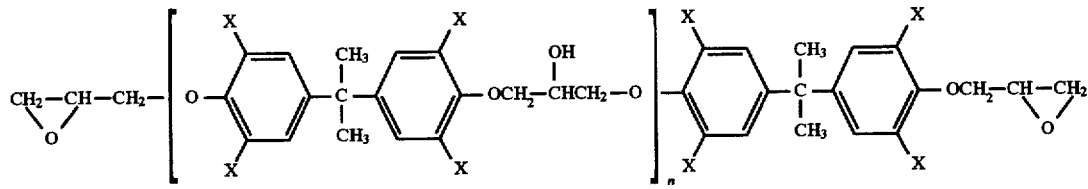

where X represents hydrogen or bromine and n is an average number between zero and less than 2.3 (see EP-A 180 471, for example).

Tetrabromobisphenol A oligocarbonate and tetrachlorobisphenol A oliglocarbonate are represented by formula (II), the oligomers being terminated either with phenol or with tribromophenol or trichlorophenol:

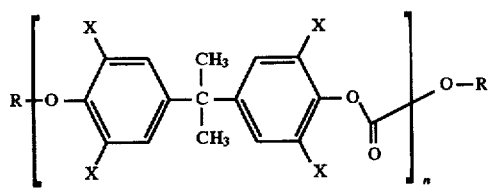

where R represents

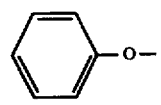

or

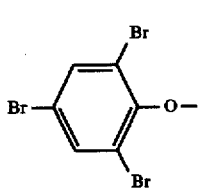

and where X represents hydrogen, bromine or chlorine and n is an average number between 4 and 7.

Tetrabromo(chloro)bisphenol A is known and can be prepared by known methods.

The phosphorus compounds according to EP-A 345 522 (US-PS 061,745) or DE-OS 4 328 656.9, in the amounts described there, are suitable as organic phosphorus compounds. Examples of these include triphenyl phosphate, oligomeric phosphates, resorcinol diphosphate or a mixture thereof.

Component G

Suitable elastomeric modifiers include commercially available EP(D)M rubbers, graft rubbers based on butadiene, styrene, acrylonitrile (see the ABS graft polymers described above, for example), acrylate rubbers, thermoplastic polyurethanes or EVA copolymers with or without functional coupling groups.

Component H

Antimony trioxide is generally known. If antimony trioxide is added to the composition, preferably 1 to 6, especially preferably 2 to 5 parts by weight are used. Antimony trioxide in combination with copper pyrophosphate hydrate is especially advantageous.

The molding compositions according to the invention may contain customary additives such as slip additives, mold release agents, nucleating agents, antistatic agents and stabilisers.

The molding compositions according to the invention, comprising the respective components and optionally other known additives such as stabilisers, colorants, pigments, slip additives and mold release agents, reinforcing materials, nucleating agents and antistatic agents, may be produced by mixing the respective constituents in the known manner and compounding or extruding the melt at temperatures of 180° C. to 330° C. in customary units such as internal kneaders, extruders or double shaft screw units.

EXAMPLES

Example 1

1% copper pyrophosphate hydrate was physically mixed with a compound of 80.9% by weight polybutylene terephthalate; limiting viscosity I.V.=1.135–1.210

13.5% by weight ethylene-bis-tetrabromophthalimide (Saytex BT93 weiβ, supplied by Ethyl)

5.0% by weight antimony trioxide and 0.6% by weight of processing stabilisers and was processed by means of an injection molding machine to form molding.

Example 2

1% by weight copper pyrophosphate hydrate was physically mixed with a compound of 80.9% by weight polybutylene terephthalate; limiting viscosity I.V.=1.135–1.210 13.5% by weight ethylene-bis-tetrabromophthalimide (Saytex BT93 weiβ, supplied by Ethyl)

5.0% by weight antimony trioxide and 0.6% by weight of processing stabilisers and was subsequently compounded by means of an extruder. The granular material obtained was injection molded in an injection molding machine to form slabs.

Example 3

1% by weight copper pyrophosphate hydrate was physically mixed with a compound of 99.5% by weight polybutylene terephthalate; limiting viscosity I.V.=0.90–0.95 and 0.5% by weight of processing stabilisers and was subsequently compounded by means of an extruder. The granular material obtained was molded in an injection molding machine to form slabs.

Example 4

1% by weight copper pyrophosphate hydrate was physically mixed with a compound of 44.3% by weight polybutylene terephthalate; limiting viscosity I.V.=1.015–1.135, 20.0% by weight of glass fibres (average length 4.5 mm)
20.0% by weight of SAN
15.0% by weight graft rubber
0.7% by weight of processing stabilisers
and was subsequently compounded by means of an extruder. The granular material obtained was molded in an injection molding machine to form slabs.

Example 5

1% by weight copper pyrophosphate hydrate was physically mixed with a compound of
79.5% by weight polybutylene terephthalate; limiting viscosity I.V.=0.90–0.95,
20.0% by weight of glass fibres (average length 4.5 mm)
0.50% by weight of processing stabilisers
and was subsequently compounded by means of an extruder. The granular material obtained was molded in an injection molding machine to form slabs.

Example 6

1% by weight copper pyrophosphate hydrate was physically mixed with a compound of
54.9% by weight polybutylene terephthalate; limiting viscosity I.V.=0.90–0.95,
30.0% by weight of glass fibres (average length 4.5 mm)
10.0% by weight tetrabromobisphenol A
4.5% by weight antimony trioxide
0.6% by weight of processing stabilisers
and was subsequently compounded by means of an extruder. The granular material obtained was molded in an injection molding machine to form slabs.

Example 7

0.5% by weight copper pyrophosphate hydrate and
0.5% by weight copper (II) hydroxide-phosphate were physically mixed with a compound of
80.9% by weight polybutylene terephthalate; limiting viscosity I.V.=1.135–1.210
13.5% by weight ethylene-bis-tetrabromophthalimide
5.0% by weight antimony trioxide and
0.6% by weight of processing stabilisers
and was subsequently compounded by means of an extruder. The granular material obtained was molded in an injection molding machine to form slabs.

Example 8

0.5% by weight copper pyrophosphate hydrate and
0.5% by weight copper (II) hydroxide-phosphate were physically mixed with a compound of
79.5% by weight polybutylene terephthalate; limiting viscosity I.V.=0.90–0.95
20.0% by weight of glass fibres, 4.5 mm
0.50% by weight of processing stabilisers
and was subsequently compounded by means of an extruder. The granular material obtained was molded in an injection molding machine to form slabs.

Example 9

0.5% by weight copper (II) hydroxide-phosphate
0.5% by weight manganese sulphate hydrate
0.5% by weight Bayer-Titan R-KB2
98.5% by weight Durethan BKV 30 H 1-0

The slabs were inscribed with a FOBA-LAS Nd-YAG laser at wavelengths of 532 and 1064 nm.

Black, dark or dark grey characters, depending on the energy of the laser beam, were produced on a light background.

Result of Examples 1 to 9

All the inscribed characters and symbols were characterised by very good contrast, with various dark grey to black gradations.

We claim:

1. A thermoplastic molding composition, comprising
A) 99.95 to 30 parts by weight of thermoplastic polymer,
B) 0.05 to 2.5 parts by weight of copper pyrophosphate hydrate,
C) 0 to 3 parts by weight of copper (II) hydroxide phosphate,
E) 0 to 50 parts by weight of fillers and reinforcing materials,
F) 0 to 60 parts by weight of flame retardant additives,
G) 0 to 30 parts by weight of elastomeric modifiers,
H) 0 to 8 parts by weight of antimony trioxide,
wherein component A) comprises at least one polymer or copolymer selected from the group consisting of a polyalkylene terephthalate, an aromatic polyester, a polyamide, a polycarbonate, a polyacrylate, a polymethacrylate, an ABS graft polymer, a polyolefine, a polystyrene, a polyoxymethylene, a polyimide, a polyether and a polyether ketone.

2. A thermoplastic molding composition according to claim 1, wherein component F) comprises at least one compound selected from the group consisting of magnesium hydroxide, calcium magnesium carbonate hydrate, one or more halogenated compounds, and antimony oxide.

3. A thermoplastic molding composition according to claim 2, wherein said one or more halogenated compounds are selected from the group consisting of ethylene-1,2-bistetrabromophthalimide, epoxidised tetrabromobisphenol A resin, tetrabromobisphenol A oligocarbonate, tetrachlorobisphenol A oligocarbonate, pentabromopolyacrylate, brominated polystyrene and one or more organic phosphorus compounds.

4. A method of using the molding composition according to claim 1, comprising the step of inserting the molding composition into a mold to produce a molded body.

5. Moldings produced from the thermoplastic molding composition according to claim 1.

6. A thermoplastic molding composition according to claim 1, wherein component A) is a polyolefin.

7. A thermoplastic molding composition according to claim 6, wherein component A) is polyethylene or polypropylene.

8. A thermoplastic molding composition according to claim 1, wherein component A) is thermoplastic polymer based on a polyalkylene terephthalate.

9. A thermoplastic molding composition according to claim 8, wherein component A) is polybutylene terephthalate.

10. A thermoplastic molding composition according to claim 1, wherein the amount of component B) in said composition is 0.5 to 2.5 parts by weight.

11. A thermoplastic molding composition, comprising 99.95 to 30 parts by weight of thermoplastic polymer, 0.05 to 2.5 parts by weight of copper pyrophosphate hydrate, 0 to 3 parts by weight of copper (II) hydroxide phosphate, 0 to 50 parts by weight of fillers and reinforcing materials, 0 to 60 parts by weight of flame retardant additives, 0 to 30 parts by weight of elastomeric modifiers, and 0 to 8 parts by weight of antimony trioxide, wherein the thermoplastic polymer is a blend of at least two polymers or copolymers selected from the group consisting of a polyalkylene terephthalate, an aromatic polyester, a polyamide, a polycarbonate, a polyacrylate, a polymethacrylate, an ABS graft polymer, a polyolefine, a polystyrene, a polyoxymethylene, a polyimide, a polyether and a polyether ketone.

12. A thermoplastic molding composition according to claim 11, wherein the amount of copper pyrophosphate hydrate in said composition is 0.5 to 2.5 parts by weight.

13. A thermoplastic molding composition, comprising
A) 99.95 to 30 parts by weight of thermoplastic polymer,
B) 1 to 3 parts by weight of copper pyrophosphate hydrate,
C) 0 to 3 parts by weight of copper (II) hydroxide phosphate,
E) 0 to 50 parts by weight of fillers and reinforcing materials,
F) 0 to 60 parts by weight of flame retardant additives,
G) 0 to 30 parts by weight of elastomeric modifiers,
H) 0 to 8 parts by weight of antimony trioxide,
wherein component A) comprises at least one polymer or copolymer selected from the group consisting of a polyalkylene terephthalate, an aromatic polyester, a polyamide, a polycarbonate, a polyacrylate, a polymethacrylate, an ABS graft polymer, a polyolefine, a polystyrene, a polyoxymethylene, a polyimide, a polyether and a polyether ketone.

14. A thermoplastic molding composition according to claim 13, wherein component A) comprises a blend of at least two polymers or copolymers selected from the group consisting of a polyalkylene terephthalate, an aromatic polyester, a polyamide, a polycarbonate, a polyacrylate, a polymethacrylate, an ABS graft polymer, a polyolefine, a polystyrene, a polyoxymethylene, a polyimide, a polyether and a polyether ketone.

* * * * *